Feb. 23, 1954    R. B. HARTMAN ET AL    2,670,457
DETECTOR FOR FERROUS METAL
Filed Jan. 23, 1952    3 Sheets-Sheet 1
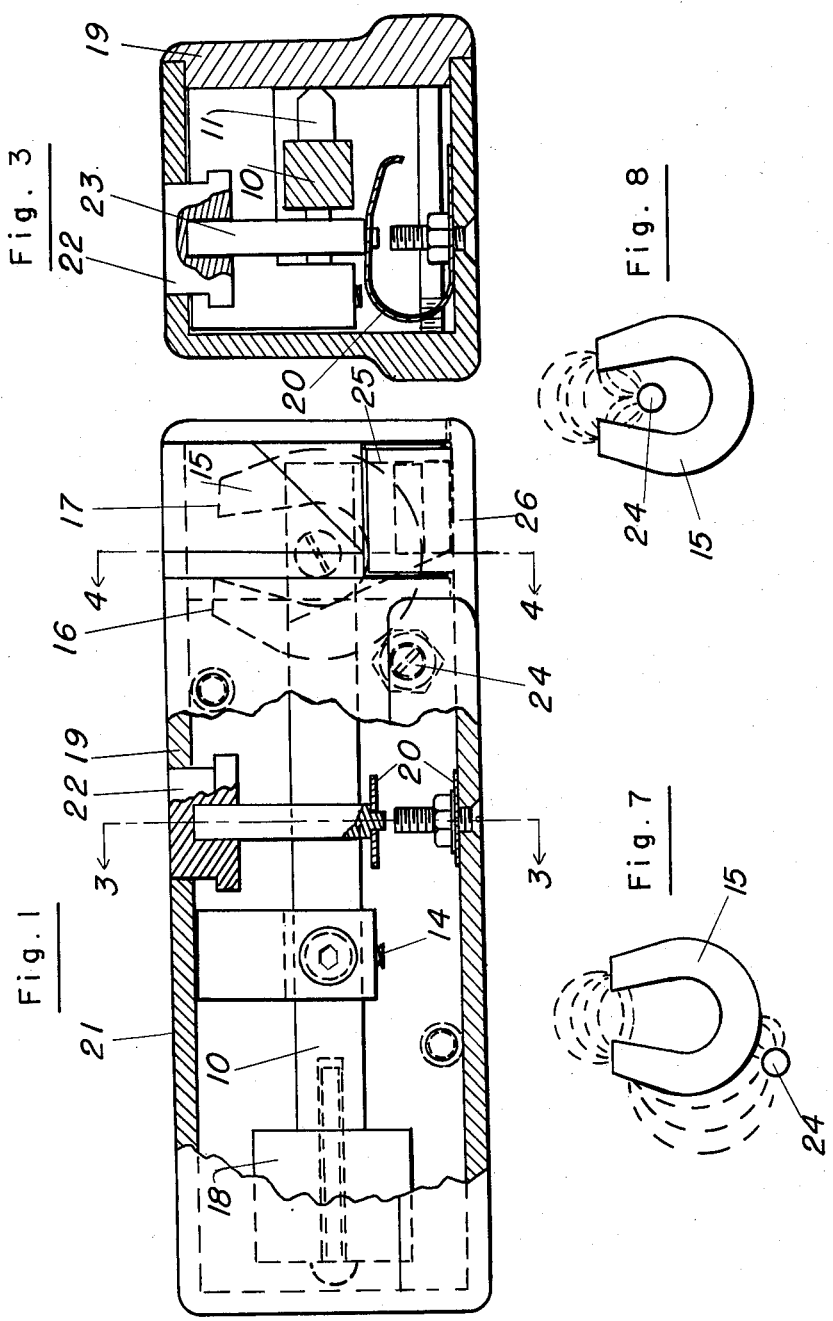
INVENTORS
Robert B. Hartman
William H. Aitken
BY
John H. Lewis Jr.

Feb. 23, 1954     R. B. HARTMAN ET AL     2,670,457
DETECTOR FOR FERROUS METAL
Filed Jan. 23, 1952     3 Sheets-Sheet 2
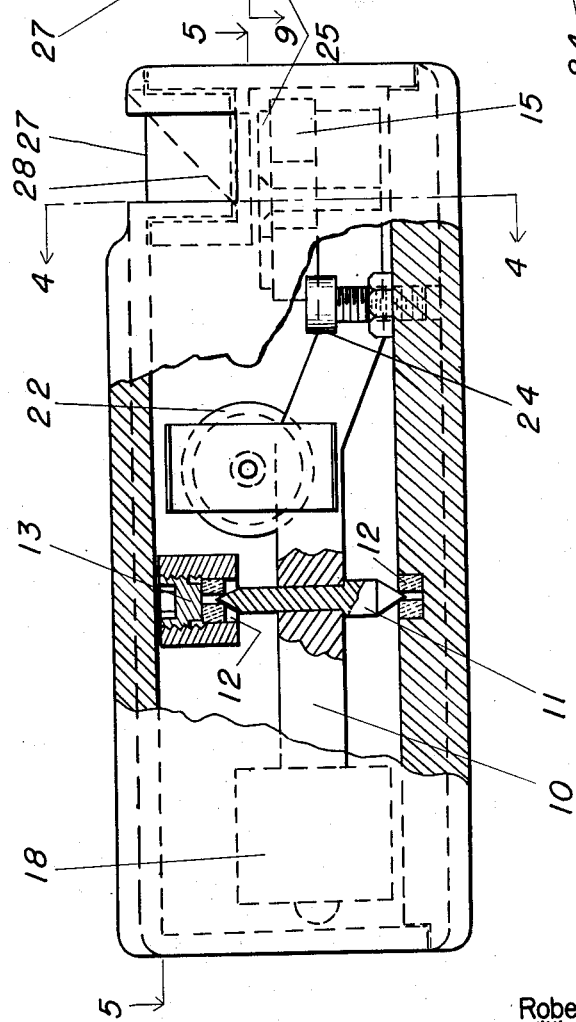
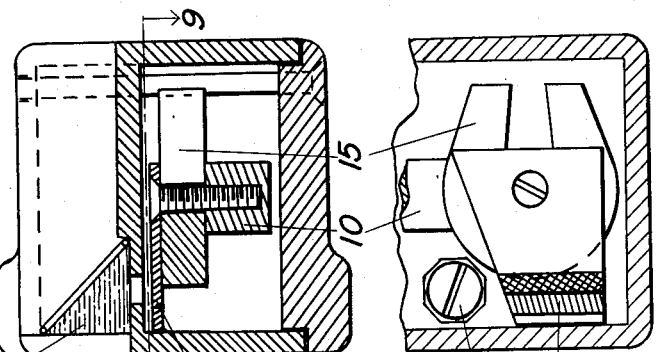
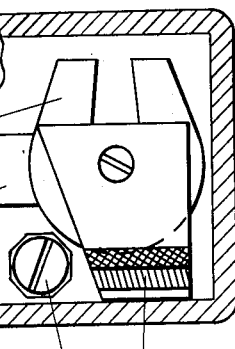
INVENTORS
Robert B. Hartman
William H. Aitken
BY

*INVENTORS*
Robert B. Hartman
William H. Aitken
BY

Patented Feb. 23, 1954

2,670,457

UNITED STATES PATENT OFFICE 2,670,457

DETECTOR FOR FERROUS METAL

Robert B. Hartman, Bridgeport, and William H. Aitken, Milford, Conn., assignors to Remington Arms Company, Inc., Bridgeport, Conn., a corporation of Connecticut Application January 23, 1952, Serial No. 267,816

11 Claims. (Cl. 324—41)

This invention relates to a testing instrument for detecting the presence of a ferrous metal object within a predetermined area.

In modern building construction, there is increasing use of concrete as a medium for building columns, walls, floors, etc. Such concrete structures include steel reinforcing, pipe, and wiring conduits concealed beneath the surface. There is frequent need to drill holes or to fasten other equipment to such reinforced structures by means of expansion bolts, drive-in studs, and other devices. For this purpose, it is desirable to make some convenient test to insure that the fastener is not obstructed by a sub-surface reinforcing rod, conduit, beam, or other ferrous metal object. There is particular need for a testing instrument of this character for use with explosive cartridge powered fastening devices which are adapted to the driving of hardened studs and other fasteners into concrete structures.

It is the major object of this invention to provide a simple reliable testing instrument for determining whether a ferrous or other magnetic metal obstruction is present in a given area within a given minimum distance from the surface.

We contemplate that we can best accomplish this objective by mounting a permanent magnet on a counter-balanced beam which can be placed with the magnet closely adjacent to the surface to be tested. An adjustable means is provided which tends to draw the magnet away from the test surface and which will be able to do so in the event the magnet is not attracted to some magnetic body within the prescribed distance. This withdrawing force may be either a spring or a magnetic arrangement which may utilize the magnetic attractive force between a ferromagnetic member fixed in the housing of the test device and either the searching magnet or a separate retracting magnet.

The exact nature of the invention as well as other objects and advantages thereof will become apparent from consideration of the following detailed specification referring to the attached drawings in which:

Fig. 1 is a top plan view, partially in section, illustrating a preferred embodiment.

Fig. 2 is a side elevational view partially in section.

Fig. 3 is a vertical cross-sectional view on the line 3—3 of Fig. 1.

Fig. 4 is a vertical cross-sectional view on the line 4—4 of Figs. 1 and 2.

Figs. 7 and 8 are diagrammatic views, showing the flux pattern existing between typical searching magnets and ferro-magnetic bodies fixed adjacent thereto.

Fig. 9 is a partial horizontal sectional view taken on the line 9—9 of Fig. 4.

Figure 5:
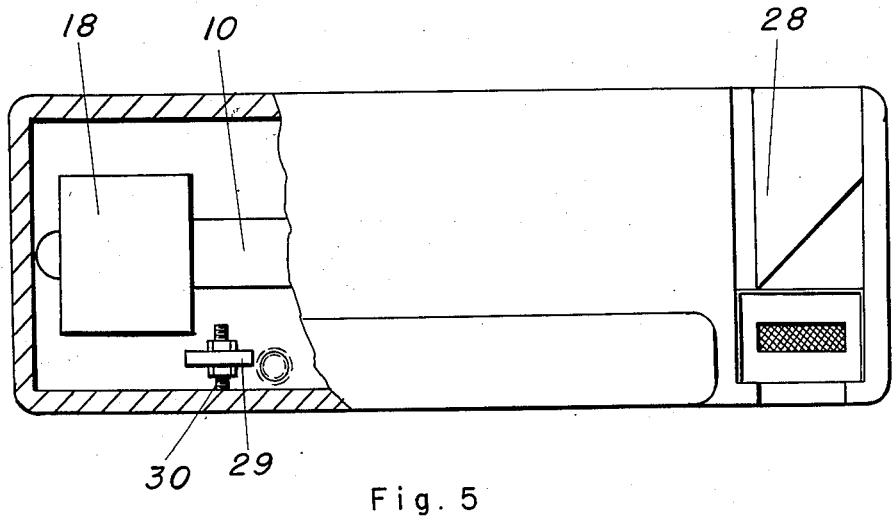
Fig. 5 is a partial horizontal section on the line 5—5 of Fig. 2, showing a modification in the means for providing a withdrawing force.

Referring to the drawings by characters of reference, it may be seen that we have provided a beam 10, preferably of aluminum or other non-magnetic material, provided with a pivot shaft 11 which is received in pivot bearings 12, at least one of which is longitudinally adjustable as by the cap screw 13 which may be secured by a radially extending lock screw 14. Conveniently, the bearings 12 may be formed of short sections of small bore tubing of a relatively hard somewhat resilient plastic. The synthetic material, polytetrafluoroethylene, sold under the trade-name of "Teflon" by E. I. du Pont de Nemours & Company, Inc., has proved highly satisfactory, as have certain of the synthetic linear polyamides of the nylon family.

At one end of the beam 10 there is supported a permanent magnet 15 which should be of a type and material providing high flux density and is preferably polarized so that the end faces 16 and 17 of the horseshoe are of opposite polarity. The alloy of aluminum, nickel, and cobalt, particularly that known as "Alnico V" is a highly satisfactory magnet material.

At the other end of the beam 10 there is provided a counterweight 18, which is of such mass and so adjusted relative to the pivots that with the searching magnet 15 remote from any ferromagnetic material the beam is statically balanced in all positions.

In the inactive position, the faces 16 and 17 of the searching magnet 15 are held against the inside face of the housing 19 by such means as the spring leaf 20. However, when the outer face 21 of the instrument is placed against a wall, ceiling, or floor, preferably by a rocking motion pivoting about one longitudinal edge of the face 21, the button 22 is depressed to a position flush with the face 21, and the attached plunger 23 depresses the spring 20 and frees the beam. If any ferro-magnetic object is embedded in the surface against which the face 21 is held, the magnet 15 will be attracted to that object and will resist any force tending to retract the magnet. Within limits which are not clearly defined, the magnitude of the attraction will be substantially directly proportional to the size of the ferromagnetic object and inversely proportional to some power of the distance higher than the first power. In all of the figures of the drawings the instrument has been shown as it would be in the active position with the button 22 depressed flush with the case. The position of the searching magnet and the beam is that which would result in the absence of ferro-magnetic material within the field of sensitivity of the instrument.

To provide an indication of the absence of ferro-magnetic material, means are provided which act with adjustable force to draw the searching magnet away from the inside surface of the housing. In a typical application, these withdrawing means have been adjusted to exert a force only slightly less than the attractive force between the searching magnet and a one-half inch steel reinforcing rod embedded to a depth of three-quarters of an inch or less in concrete. A similar reinforcing rod at a greater depth would not be detected, while a wire or smaller reinforcing rod would only be detected if it were materially closer to the surface than three-quarters of an inch. For many purposes, a steel wire or nail would not be deemed a substantial body and the adjustment should preferably be made by adjustment with actual specimens of the minimum size to be detected embedded to a distance barely over the distance determined to be a safe minimum.

In the various figures of the drawings, we have shown several modifications in the means to provide an adjustable withdrawing force for the searching magnet.

The simplest and preferred form requires only the provision of a soft iron screw 24 within the field of the magnet, which is so positioned that in the absence of ferro-magnetic material across the poles 16 and 17 the searching magnet will be attracted to the screw and thereby withdrawn from contact with the inner wall of the casing. Such a screw is preferably made vertically adjustable in a threaded bore in the base of the casing 19 which may be of aluminum or other non-magnetic material. Obviously, as the screw is moved away from the plane in which the magnet is constrained to swing by the pivotal mounting of the beam, the force attracting the magnet to the screw will be diminished. Very fine adjustments may be obtained in this way. Fig. 8 shows diagrammatically the flux pattern existing between a conventional two-pole magnet and a retracting screw 24. With specially polarized Alnico magnets having a pole on the arch of the horseshoe, shown diagrammatically in Fig. 7, a greater latitude is provided in the location of such a screw 24 within the case, but the principle of adjustment is the same.

Magnetic retracting arrangements are particularly desirable in that there is no dead-center position. If the force attracting the searching magnet to the concealed object is greatest, the beam does not move when freed by contact with the surface. If the withdrawing force is barely sufficient to overcome the attractive force or if the attractive force is altogether absent, the searching magnet, when freed, will immediately be retracted from the inside wall of the casing, the retracting force becoming greater as the searching magnet swings toward the retracting screw.

For convenience in observation, an aluminum or other non-magnetic indicator flag 25 is mounted on the searching magnet, as best seen in Fig. 9, and may conveniently serve as a hold-down plate for securing the magnet. This flag is visible through a window 26 in the casing and may conveniently be provided with a red sector visible through the window when the searching magnet is against the inside face of the casing and with a green sector visible through the window when the searching magnet has been retracted therefrom. A right angle prism 27 may be secured above the window to provide both direct and indirect viewing of the window.

Conveniently, the casing is molded to provide a troughlike indentation 28, the bottom edge of which intersects the searching face in a location near the midpoint between the magnet faces 16 and 17. This indentation provides a reference point in which a mark may be made to indicate the presence or absence of ferro-magnetic material in the area being tested.

In Fig. 5 we have shown a modification in the withdrawing means which consists in the provision of a small retracting magnet 29 arranged to exert a retracting force upon a ferro-magnetic counterweight 18 or any other ferro-magnetic element which may be secured to the beam 10. To control sensitivity, this magnet may be adjustably positioned, as between nuts on a bolt 30, to vary the proportion of flux lines passing through the ferro-magnetic element on the beam.

Figure 6:
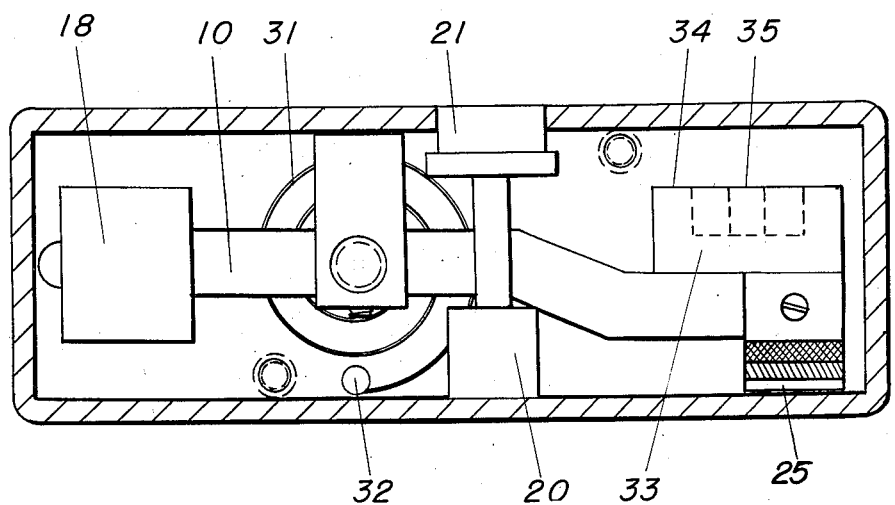
Fig. 6 is a view similar to Fig. 1, showing another modification in the means for providing a withdrawing force as well as a modification in the type of searching magnet employed.

In Fig. 6 we have shown a modification in which the retracing force is provided by a spiral spring 31, one end of which is attached to the pivot shaft 11 while the other end is attached to a block 32 preferably adjustably mounted on the base of the instrument housing.

Fig. 6 also illustrates a modified form of searching magnet which is more expensive and bulky but in all other respects is preferable. The modified searching magnet 33 is shaped in the form of a cup having an annular rim 34 and a centrally disposed post 35. Such a magnet should be polarized with the rim of one polarity and the end of the central post of the opposite polarity. Obviously, such a structure can be built up with a soft iron cup and with only the cylindrical center post in the form of permanent magnet material of high flux density. The outstanding advantage of such a construction is its uniformity of response in all positions because of the symmetry of the magnetic field. The simple horseshoe magnets illustrated in the other figures are naturally more sensitive to an elongated object parallel to a line passing between the two poles of the magnet than they are to an elongated object running normal to that line.

In using our device, the casing is grasped firmly and one of the longitudinal edges of the face 21 is placed against the wall or other structure to be tested, with the bottom of the indentation 28 substantially opposite the point at which it is desired to drill a hole, drive a fastener, or perform some other operation. The casing is preferably then rocked about the edge first brought into contact to bring the whole face 21 against the wall and to depress the button 22 and free the beam.

If there is any substantial body of ferro-magnetic material within the area to which the instrument is sensitive, the beam will not be retracted and the appropriate indication will be visible through the prism 27. In the absence of ferro-magnetic material, the beam will be retracted. If the instrument is one of the type employing the simple horseshoe magnet and the instrument fails to indicate the presence of ferromagnetic material, the indication should be confirmed by turning the instrument 90° from its original position and reapplying the surface 21 to the wall to be tested. Such a confirmation is not necessary if the symmetrical cup and center post magnet is used.

The sensitivity of the instrument may be increased by the use of magnets of greater size or higher flux density, by the use of retracting means exerting less force, and/or by the use of more delicate bearings. It is expected that the greatest utilization of this instrument will be in connection with the use of explosive cartridge operated construction tools, for which purpose a rugged tool is essential, even though at the expense of sensitivity. It may, however, be pointed out that the preferred embodiment illustrated herein has been quite successfully used in locating concealed electrical conduit and outlet boxes and, when the retracting means has been set for maximum sensitivity, has been successfully used for locating studding behind plastered walls by the detection of the nails utilized to attach the lath.

Although we have limited our illustration to a preferred embodiment and several simple modifications thereof, we wish it to be understood that we consider our invention to extend to all equivalent devices and constructions coming within the terms of the claims appended hereto.

We claim:

1. A testing instrument comprising a housing of non-magnetic material having one side which is adapted to be placed in contact with a surface to be tested; a permanently magnetic element supported within said housing for movement toward and away from said side, said magnetic element being arranged to be attracted toward any ferro-magnetic material beyond the side of said housing; and yieldable non-gravitational retracting means mounted within said housing and acting in opposition to any force attracting said magnetic element toward said side, said retracting means being adjustable in force to be capable of overcoming the force attracting said magnetic element toward ferromagnetic material beyond the side of said housing only when said attracting force is less than a predetermined value indicative of a predetermined safe distance to said ferro-magnetic material, the magnetic element and the supporting means therefor being statically balanced with regard to gravitational forces in any direction of orientation of said instrument whereby the instrument may be used in any position and said magnetic element will be positioned solely by the greater of the forces including the force exerted by the retracting means and the force attracting said magnetic element toward ferro-magnetic material beyond the side of said housing, said testing instrument including yieldable retaining means to secure the magnetic element in its position of maximum displacement toward said side when the instrument is not in use; and means to release said retaining means to permit said magnetic element to position itself in response to the opposing force of attraction toward said ferro-magnetic material and the force of said retracting means.

2. A testing instrument as defined in claim 1, said retaining means including a spring member capable of exerting on said magnetic member a materially greater force than said retracting means.

3. A testing instrument as defined in claim 2, said means to release said retaining means including a depressible push button engaged with said spring member.

4. A testing instrument as defined in claim 3, said depressible push button member being mounted in the side of said housing which is adapted to be placed in contact with the surface to be tested, and, in the absence of pressure against such surface, protruding from the side of said housing a distance greater than the length of movement of the push button required to release said retaining means.

5. A testing instrument as defined in claim 1, said retracting means including a member mounted on the housing, said member being formed of ferro-magnetic material and adjustably positioned in said housing within a portion of the flux pattern of said magnetic element whereby said magnetic element will tend to be attracted toward said member mounted on the housing and away from said side of the housing, the adjustable positioning of said member serving to adjust the retracting force.

6. A testing instrument as defined in claim 1, said retracting means including a retracting spring in operative engagement with said magnetic element.

7. A testing instrument as defined in claim 1, including a window formed in said housing, an indicator fixedly positioned in relation to said magnetic element and visible through said window, and a transparent right angle prism supported over said window and permitting said indicator to be viewed from positions directly in line with said window as well as at right angles thereto.

8. A testing instrument comprising a housing of non-magnetic material having one side which is adapted to be placed in contact with a surface to be tested for the presence of embedded ferromagnetic material; a permanently magnetic element adapted to be attracted toward any ferromagnetic material beyond the side of said housing; a beam assembly supporting said magnetic element for movement toward and away from said side of the housing, said beam assembly and the magnetic element supported thereon being statically balanced with regard to gravitational forces in any position of orientation of said instrument; releasable beam retaining means to secure the magnetic element against said side of the housing until said side has been engaged with the surface to be tested; and non-gravitational beam retracting means adjustably mounted in said housing and exerting a magnetic force upon said beam tending to retract said magnetic element from said side of the housing, said retracting means being adjusted to exert sufficient retracting force to overcome the force attracting said magnetic element toward any body of ferro-magnetic material beyond a predetermined distance from said side.

9. A testing instrument as defined in claim 8, said beam retaining means including a depressible push button projecting through said side of the housing and operatively connected to release the retaining means only when said side of the housing is pressed against a surface to be tested with sufficient force to depress said push button.

10. A testing instrument as defined in claim 9, said beam carrying an indicating marker which, in the absence of retraction of said beam, is visible to indicate that ferro-magnetic material is present within said predetermined distance from said side, said marker moving out of the field of visibility only when the instrument is fully operative and in the absence of any substantial body of ferro-magnetic material within said predetermined distance.

11. A testing instrument as defined in claim 10, said housing being formed to define a window through which said marker may be observed when in indicating position; and prismatic means over said window permitting observation thereof from at least two directions.

ROBERT B. HARTMAN.
WILLIAM H. AITKEN.

References Cited in the file of this patent

UNITED STATES PATENTS

| Number | Name | Date |
|---|---|---|
| 1,778,653 | Wineman | Oct. 14, 1930 |
| 1,971,189 | Leibing | Aug. 21, 1934 |
| 1,976,636 | Roux | Oct. 9, 1934 |
| 2,346,773 | McBride | Apr. 18, 1944 |
| 2,487,047 | Farnham | Nov. 8, 1949 |
| 2,543,570 | Eder | Feb. 27, 1951 |
| 2,579,404 | Stevenson | Dec. 18, 1951 |
| 2,585,974 | Taylor et al. | Feb. 19, 1952 |
| 2,600,857 | De La Mater | June 17, 1952 |

FOREIGN PATENTS

| Number | Country | Date |
|---|---|---|
| 575,150 | Great Britain | Feb. 5, 1946 |